Nov. 25, 1969  YUNG SHING HSU  3,480,306
FASTENER STRUCTURES

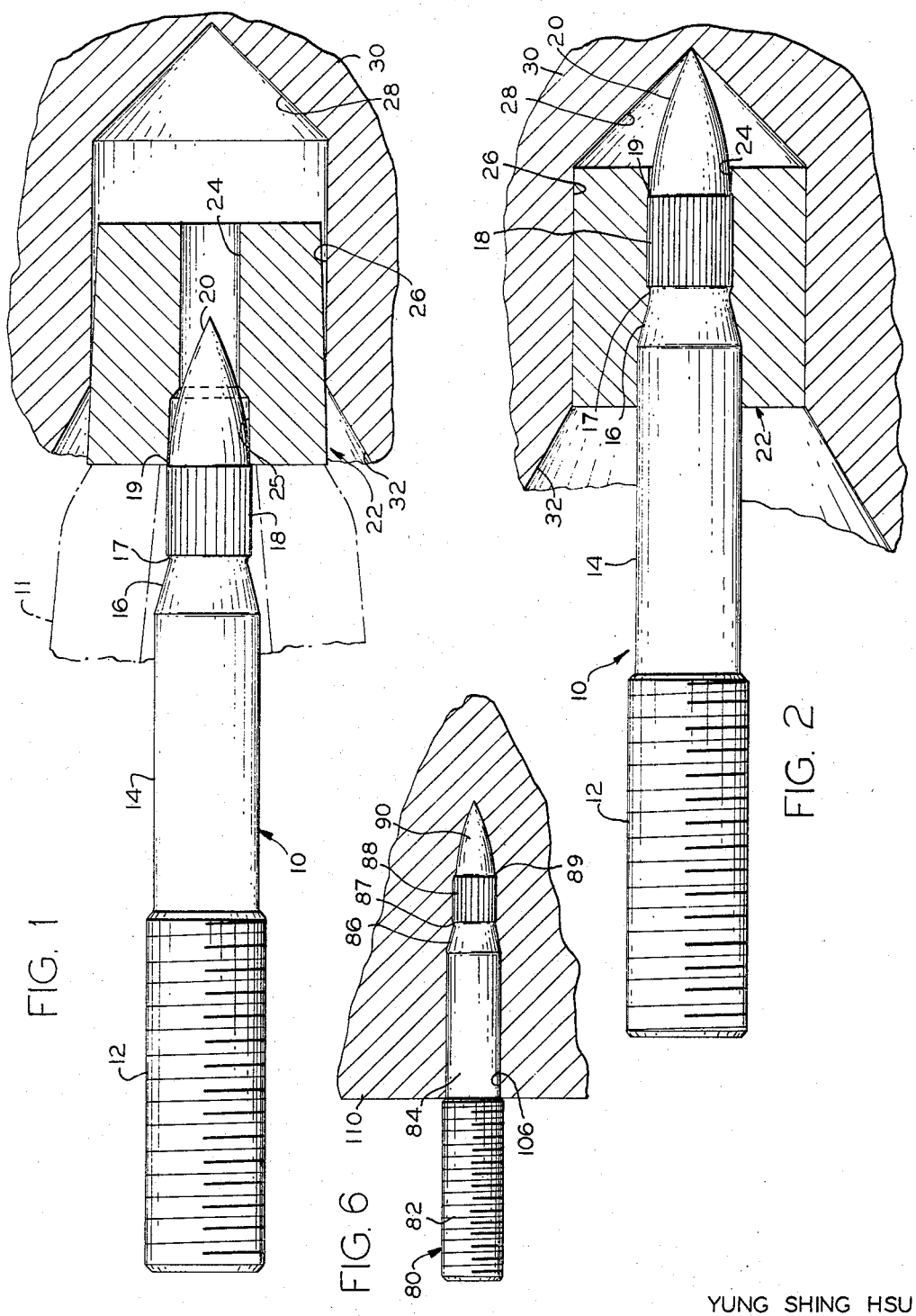

Filed Sept. 7, 1967  2 Sheets-Sheet 2

YUNG SHING HSU
INVENTOR
BY
BUCKHORN, BLORE, KLARQUIST & SPARKMAN
ATTORNEYS

3,480,306
FASTENER STRUCTURES
Yung Shing Hsu, Milwaukie, Oreg., assignor to Omark Industries, Inc., Portland, Oreg., a corporation of Oregon
Filed Sept. 7, 1967, Ser. No. 666,094
Int. Cl. F16b *11/00;* F16c *3/10*
U.S. Cl. 287—53   3 Claims

ABSTRACT OF THE DISCLOSURE

A fastener structure including a hard metal pin 10 driven by a powder actuated tool into a soft metal annular plug 22 in a blind hole 26 in a railroad car axle 30. The pin 10 and plug are preassembled together for ease of handling before being so driven. The pin expands the plug to lock itself in the plug and the plug in the hole 26. A ribbed or knurled portion 18 keys the pin to the plug. A cup 34 is held against the end of the axle by a sleeve nut 37, and the cup 34 holds a hotbox detector 39. In another embodiment a pin 40 anchored to a plug 52 and anchoring the plug 52 in an axle 60 holds, with a nut 67, a deep drawn cup 64 against the axle, and the cup 64 holds a hotbox detector 69. A hard pin 80 has been driven by a powder actuated tool into an undersized bore 106 in a softer metal member 110 to greatly compress the adjacent portions of the member 110 to securely lock the pin to the member 110.

DESCRIPTION

This invention relates to fastener structures and methods of making the same, and more particularly to fastener structures and methods in which pins driven by powder actuated tools are strongly anchored in solid metal members.

It has been difficult and time consuming with prior art fastener structures to strongly anchor pins or studs in thick or solid metal members, and particularly difficult to anchor pins driven by powder actuated tools in such structural members. It would be desirable to provide fastener structures and methods securely anchoring pins driven by powder actuated tools in thick structural members.

An object of the invention is to provide new and improved fastener structures and methods of making the same.

Another object of the invention is to provide fastener structures and methods of making the same in which pins driven by powder actuated tools are strongly anchored in solid metal members.

A further object of the invention is to provide a fastener structure and method of making the same in which a hard metal pin is driven into an undersized hole in a softer metal member to strongly lock the pin in the hole.

Another object of the invention is to provide a fastener structure and method of making the same in which a hard metal pin is driven into a softer metal annular plug in a blind hole in a supporting member to lock the pin to the plug and the plug to the supporting member.

Another object of the invention is to provide a fastener structure in which a hard metal pin is driven into a pilot bore in a softer metal member 10%–20% smaller in diameter than the pin to lock the pin in the member.

Another object of the invention is to provide a fastener structure in which a pin anchored in a plug expanded by the pin in a blind hole in the end of a railroad car axle has a threaded end on which a nut is screwed to lock a cup against the end of the axle.

The invention provides fastener structures and methods of making the same in which a hard metal pin is driven into an undersized bore in a softer metal member to lock the pin in the bore. The pin may have keying ribs embedded in the member. The member may be a thick metal member or may be an annular plug which is expanded in a hole in a thick metal member.

Figure 3:
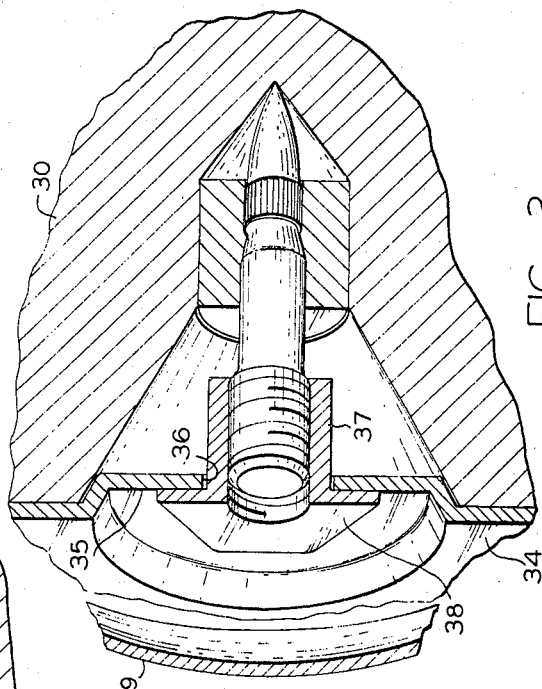
FIG. 3 is a perspective view in partial section of a section of the fastener structure of FIG. 1.

A complete understanding of the invention may be obtained from the following detailed description of fastener structures and methods of making the same forming specific embodiments thereof, when read in conjunction with the appended drawings, in which:

FIG. 1 is a sectional view of a fastener structure forming one embodiment of the invention at one stage of a method forming one embodiment of the invention;

FIG. 2 is a sectional view in partial section of the fastener structure of FIG. 1 in an assembled stage;

Embodiment of FIGS. 1 to 3

Referring now in detail to the drawings, there is shown a fastener member or drive pin or stud 10 of the type adapted to be driven by a powder actuated tool 11. The pin 10 includes a threaded head portion 12, a cylindrical intermediate shank portion 14 of a predetermined diameter, a tapered portion 16, a reduced shank portion 17, a longitudinally knurled splining portion 18, a reduced shank portion 19 of the same diameter as that of the shank portion 17 and a pilot pin portion 20, which is pointed. At least the forward end portion of the intermediate shank portion 14, the tapered portion 16 and the collar portions of the stud are of a hardness substantially greater than that of a deformable annular plug 22, which has a pilot hole 24 and an entrance counterbore 25 adapted to tightly receive the reduced shank portion 19. The annular plug 22 may be of soft or low carbon steel substantially softer than the portions 14, 16, 17, 18 and 19. The plug has a tapered outer periphery and is adapted to be easily slid into a blind hole or bore 26 of uniform diameter having a tapered bottom portion 28 in a solid structural member 30 to which the stud is to be securely fastened. The member 30 may be of any desired material, such as, for example, the same material as that of the plug, and in the embodiment disclosed herein is a cold rolled railroad car axle having a hardness of from 35 to 40 on the Rockwell C scale. The member 30 has a tapered entrance portion 32 to the hole 26.

The exterior periphery of the plug 22, while shown as tapered for the entire length, may have only a short taper at its forward end and may be cylindrical with a chamfer at its forward end. The plug should be sufficiently small in maximum external peripheral size that at least the forward two-thirds of its length enters the bore 26 when the pin and plug are manually pushed into the hole, and should be of a minimum external peripheral size that it fits snugly in the hole 26 when manually pushed fully into the hole. For best results, the diameter of the bore 24 should be from 10% to 20% less than the diameter of the shank portions 17 and 19. The longitudinally knurled portion 18 is formed by rolling a cylindrical portion of the pin initially of the same diameter as that of the shank portions 17 and 19 to form alternating longitudinal ribs and grooves with the ribs positioned radially outwardly beyond the peripheries of the shank portions 17 and 19 and the grooves positioned inwardly beyond the peripheries of the shank portions 17 and 19. The taper of the external periphery of the plug preferably is from about 1°40′ to 2°.

The length of the counterbore 25 is approximately the same as that of the tapered intermediate shank portion 16 of the pin 10 and is of a diameter such that, when the pin is driven into the plug 22 to its final position thereof shown in FIGS. 2 and 3, the portion 16 of the pin expands the coextensive counterbored portion of the plug to cause that portion to be compressed against and frictionally grip the adjacent portion of the hole 26 to the same extent that the exterior portion of the plug coextensive with the portions 17, 18 and 19 of the pin is compressed against and frictionally grips the portion of the hole 26 coextensive with the portions 17, 18 and 19.

Prior to an assembly operation, the portions 19 and 20 of the pin 10 are driven into the plug 22 to the positions thereof shown in FIG. 1 to tightly lock the pin to the plug so that the pin and plug may be handled as a unit with the sizes of the pin and plug those desired for installing in the member 30. Then the pin and the plug are placed in the muzzle end of the tool 11 and the plug is pushed into the hole 26 from two-thirds of the length of the plug to the full length of the plug, depending on the fit between the plug and the hole. Then the tool 11 is fired to drive the pin into the plug until the end 20 engages the end of the tapered portion of the hole and, if the plug is not bottomed in the hole 26, move the plug against the bottom of the hole 26. As the portions 17, 18 and 19 of the pin enter the bore 24, they expand the plug beyond its elastic limit and press the portion of the external periphery of the plug coextensive therewith tightly against the wall of the hole 26. The tapered intermediate portion 16 of the pin enters the counterbore 25 and expands the portion of the plug so entered to grip the wall of the hole 26 tightly. The ribs of the knurled portion 18 cut their way into the plug to spline the pin to the plug. The pin now is very securely anchored in and keyed to the plug and the plug is very securely anchored in the member 30 and also is held very securely against rotation therein by reason of the large periphery of the plug and the strong frictional interengagement of the plug and the wall of the hole 26.

After the pin 10 is anchored in the member 30, a shallow holding cup 34 having a centrally depressed portion 35 with a central hole 36 is placed on the pin and the end of the member 30. Then a sleeve nut 37 having a thin hexagonal head 38 is screwed onto the pin to lock the cup in place against the member 30. A hotbox detector 39 then is secured to the cup by snaps (not shown). The nut 37 extends inwardly from the cup 34 and engages a long length of the pin even though the pin be positioned inwardly of the cup. This permits the pin to be quite short and not extend to a position interfering with the detector 39.

In one specific example of the fastener structure of FIGS. 1 to 3, the pin 10 was of hardened steel of a hardness of 50–55 on the Rockwell C scale, the plug 22 was of soft steel of a hardness of 90–100 on the Rockwell B scale and the member 30 was of cold rolled steel of a hardness of 35–40 on the Rockwell C scale. When a pulling force of over 2500 pounds was applied to the pin, neither the pin nor the plug were moved relative to the plug and the member 30, respectively. The diameter of the portions 17 and 19 was about .172 inch, the diameter of the shank portion 14 was about .214 inch, the tapered portion 16 had about a 29° taper, the exterior diameter of the knurled portion 18 was about .187 inch, the length of the plug was ½ inch, the external diameter of the plug tapered from .465 inch to .436 inch, the diameter of the bore 24 was .125 inch, the diameter of the counterbore 25 was .156 inch and the length of the counterbore was about .100 inch.

Figure 4:
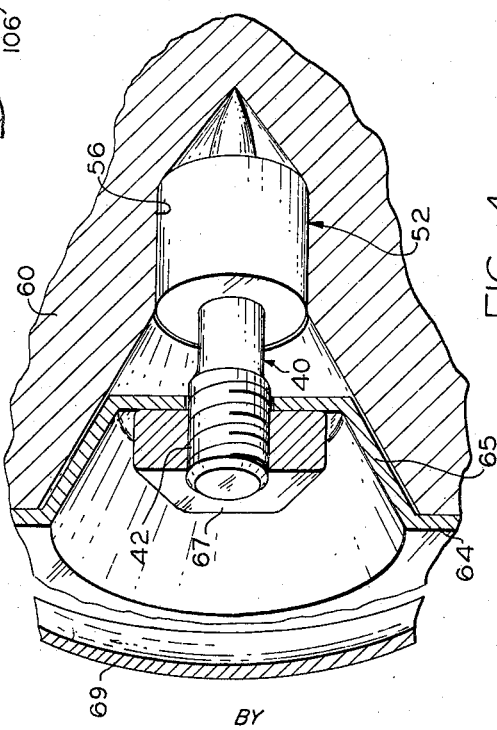
FIG. 4 is a perspective view in partial section of a fastener structure forming an alternate embodiment of the invention.

Embodiment of FIG. 4

A fastener structure shown in FIG. 4 and forming an alternate embodiment of the invention includes a pin or fastening member 40 identical to the pin 10 and a plug 62 identical to the plug 22. The plug is expanded in a bore 56 in a structural member or railroad car axle 60 like the member 30. The stud has a threaded end portion 42. The pin is securely anchored and keyed to the plug and the plug is securely gripped by the member 60. A holding cup 64 like the cup 34 but having a deep drawn cupped portion 65 is held against the end of the member 30 by a nut 67. The cup 64 holds a hotbox detector 69 thereon.

Figure 5:
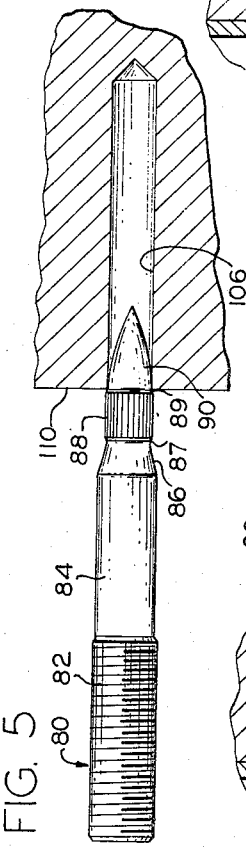
FIG. 5 is a sectional view of a fastener structure forming an alternate embodiment of the invention in one stage of a method forming an alternate embodiment of the invention; and, FIG. 6 is a sectional view of the fastener structure of FIG. 5 in an assembled stage.

Embodiment of FIGS. 5 and 6

A fastener structure forming an alternate embodiment of the invention includes a pin or fastener member 80 identical to the pin 10 and including a threaded portion 82, an intermediate shank portion 84, a tapered portion 86, a reduced shank portion 87, a longitudinally knurled portion 88, a second reduced shank portion 89 and a pointed end portion 90. A pilot hole or bore 106 in a member 110 of a metal of a hardness less than that of the pin has a diameter of from 10% to 20% less than the diameter of the intermediate shank portion 84 and smaller than the diameter of the shank portions 87 and 89. When the pin is driven into the pilot hole by a powder actuated tool, the pin expands the pilot hole to place the metal surrounding the shank portion 84 under a high compression to cause very strong interfrictional engagement therebetween to securely anchor the pin in the member 110. The longitudinal ribs of the knurled portion 88 force themselves into the member 110 to key the pin to the member 110 and also increase the anchoring of the pin in the member 110. The threads of the threaded portion 82 project outwardly beyond the periphery of the intermediate shank portion 84, the engagement of the end of the threaded portion 82 with the member 30 and the engagement of the pointed portion 90 with the bottom of the hole 106 occurs at the same time, and appreciable further penetration of the pin into the hole is stopped.

The above-described methods securely anchor and key the pins 10, 40 and 80 in the members 30, 60 and 110, and also anchor the plugs 22 and 52 securely in the members 30 and 60. The pins 10, 40 and 80 are each anchored with a holding force of well over 2000 pounds, and this holding or anchoring force also is achieved for the plugs 22 and 52 in the members 30 and 60. These high holding forces are uniformly obtainable with the fastening structures and methods described above. Thus, excellent anchoring is achieved in solid metal members with simple, inexpensive structures and methods.

It is to be understood that the above-described arrangements are simply illustrative of the application of the principles of the invention.

What is claimed is:
1. In a fastener structure,
an axle of cold rolled steel having a blind lathe centering bore in an end thereof having an inner cylindrical portion of a predetermined diameter,
a continuous annular plug of soft steel in the cylindrical portion of the hole normally of an external diameter to fit snugly in the cylindrical portion and expanded radially to fit tightly in the cylindrical portion,
a fastener pin of hard steel having a shank portion in the plug and expanding the plug to anchor the plug in the bore and the pin in the plug,
a cup member engaging the end of the axle and having a hole aligned with the pin,
the pin having a threaded portion extending outwardly from the plug, and a nut on the threaded portion engaging the cup member and holding the cup member against the end of the axle.

2. The fastener structure of claim 1 wherein the axle has a counterbore, the cup member has a cupped portion extending into the counterbore, and the nut includes a sleeve portion extending inwardly through the hole in the cup member and a head portion engaging the cupped portion.

3. The fastener structure of claim 1 wherein the axle has a counterbore, the cup member has a deep cupped portion extending into the counterbore and the nut is positioned in the cupped portion.

References Cited

UNITED STATES PATENTS

| 577,737 | 2/1897 | Flaherty | 85—83 |
| 2,010,057 | 8/1935 | Buckwalter | 295—36 |
| 2,143,176 | 1/1939 | Welsmiller et al. | 29—522 |
| 2,292,467 | 8/1942 | Norsell | 85—83 |
| 2,316,112 | 4/1943 | Temple | 227—9 |
| 2,389,479 | 11/1945 | Austin | 85—78 |
| 2,597,444 | 5/1952 | Brown et al. | 85—82 |
| 2,694,997 | 11/1954 | Alger. | |
| 2,877,682 | 3/1959 | Barry et al. | 85—84 |
| 3,041,616 | 7/1962 | Henning et al. | 227—11 |
| 2,767,877 | 10/1956 | Newsom | 85—78 |
| 3,198,058 | 8/1965 | Barry | 85—84 |

FOREIGN PATENTS

| 1,230,265 | 12/1966 | Germany. |
| 239,390 | 9/1925 | Great Britain. |
| 572,082 | 9/1945 | Great Britain. |
| 762,302 | 11/1956 | Great Britain. |
| 857,371 | 12/1960 | Great Britain. |

MARION PARSONS, JR., Primary Examiner

U.S. Cl. X.R.

29—522; 85—1, 10, 50, 78; 151—41.74; 246—169; 295—36